United States Patent
Heiman

[15] 3,676,509
[45] July 11, 1972

[54] RECOVERY OF DICYCLOPENTADIENE FROM CRACKED PETROLEUM

[72] Inventor: John C. Heiman, Lake Jackson, Tex.
[73] Assignee: The Dow Chemical Company, Midland, Mich.
[22] Filed: Jan. 20, 1971
[21] Appl. No.: 107,974

[52] U.S. Cl. ................................260/666 PY, 260/666 A
[51] Int. Cl. .................................................C07c 13/00
[58] Field of Search...........................260/666 A, 666 PY

[56] References Cited

UNITED STATES PATENTS

| | | | |
|---|---|---|---|
| 3,529,027 | 9/1970 | Helmke, Jr. et al. | 260/666 A |
| 2,372,237 | 3/1945 | Ward | 260/666 A |
| 3,016,410 | 1/1962 | Dick et al. | 260/666 A |
| 3,340,315 | 9/1967 | Renner | 260/666 A |

Primary Examiner—Delbert E. Gantz
Assistant Examiner—Veronica O'Keefe
Attorney—Griswold & Burdick, Raymond B. Ledlie and Benjamin G. Colley

[57] ABSTRACT

A process for recovering purified dicyclopentadiene from a $C_8^+$ by-product stream by separating the dicyclopentadiene-containing stream, cracking the dicyclopentadiene contained therein to cyclopentadiene, separating the cyclopentadiene from the other components and dimerizing the cyclopentadiene to a purified dicyclopentadiene.

5 Claims, 1 Drawing Figure

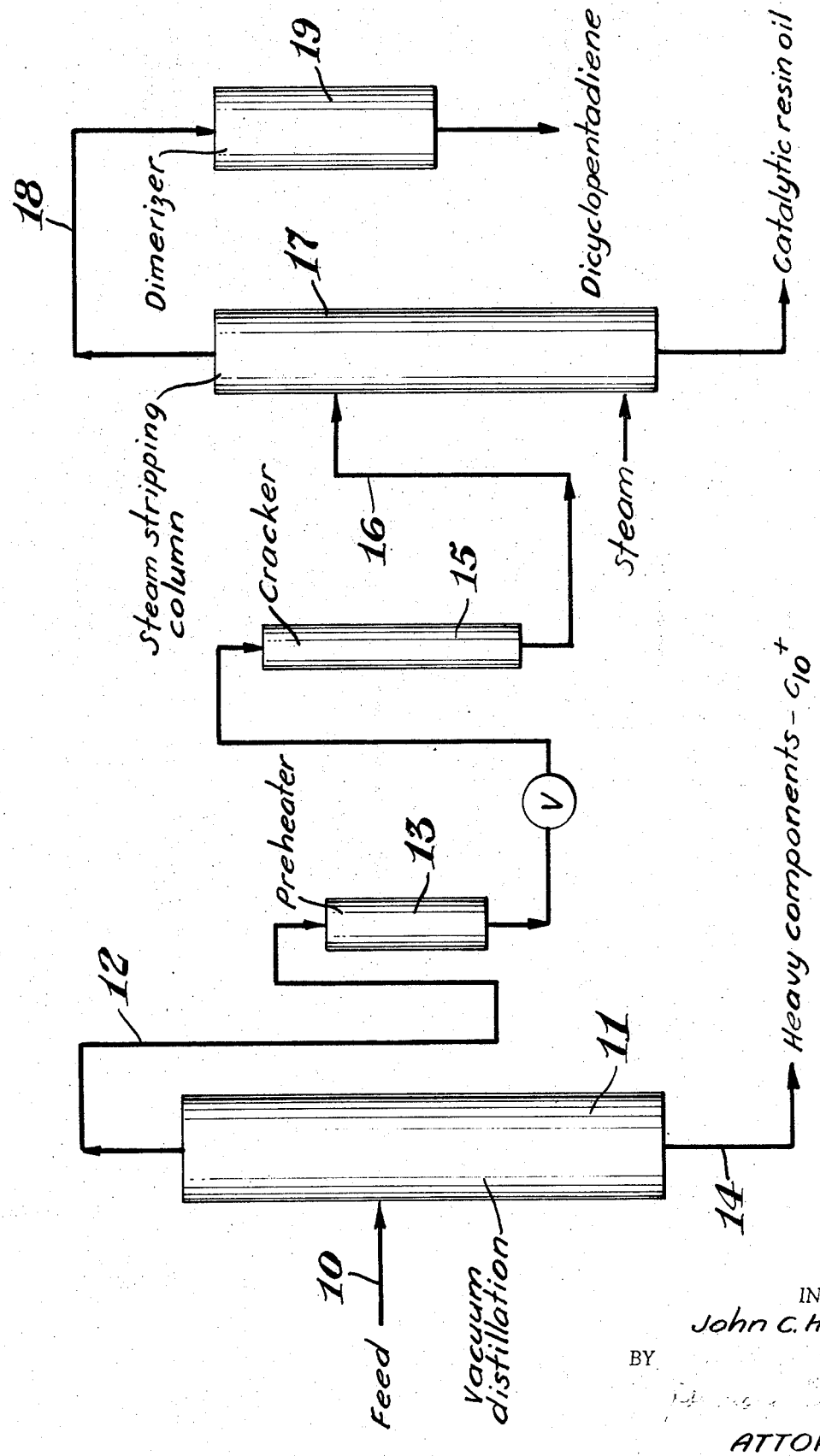

RECOVERY OF DICYCLOPENTADIENE FROM CRACKED PETROLEUM

The present invention relates to a process for obtaining a purified dicyclopentadiene from a crude cracked hydrocarbon stream containing undesirable impurities and more particularly relates to a process for separating a relatively pure stream of dicyclopentadiene from a by-product $C_8^+$ stream containing less than about 50 percent dienes.

It is an object of this invention to provide a simple and efficient process for separating a relatively pure dicyclopentadiene from the other constituents of a by-product stream. A further object is to provide a process for the recovery of dicyclopentadiene from an impure stream which process requires no diluent addition, no recycle, and exhibits little coke formation. These and other objects and advantages of the present process will become apparent from the following detailed description and the appended claims.

Dicyclopentadiene is an unsaturated, cyclic hydrocarbon employed in the manufacture of certain resins, as a modifier for drying oils and as a material in the synthesis of certain chemical compounds useful as insecticides. It is commonly obtained in the crude state from various hydrocarbon cracking operations. As obtained, the compound usually is in a mixture with impurities such as xylenes, styrene, indene and the like which are near it in boiling point and which, by conventional methods of distillation, can be separated only difficulty and to an unsatisfactory degree. Likewise, the impure streams containing dicyclopentadiene normally contain heavier components, components which polymerize and components which tend to form coke on prolonged heating.

It has now been discovered that dicyclopentadiene substantially free from objectionable impurities can be recovered from cracked petroleum streams in good yields by distilling the lighter fraction containing the dicyclopentadiene away from the heavier components in the crude stream under proper conditions. The overhead stream from this separation column is then preheated at elevated temperature and pressure then flashed to a lesser pressure to a cracking zone operated to rapidly crack the dicyclopentadiene to cyclopentadiene which is recovered by distillation and dimerized to a substantially pure dicyclopentadiene.

The FIGURE shows a schematic flow diagram of the process of this invention.

Referring to the FIGURE to illustrate a preferred embodiment of the process, a $C_8^+$ feed stream from an LPG cracking unit is fed through line 10 to Column 11. The feed had the following composition:

| | Wt.% |
|---|---|
| Cyclopentadiene | 0.007 |
| Toluene | 0.69 |
| Butadiene-Cyclopentadiene Co-dimer | 1.56 |
| Ethyl Benzene | 2.09 |
| Xylenes | 3.34 |
| Styrene | 14.36 |
| Dicyclopentadiene | 28.94 |
| Methyl Cyclopentadiene-Cyclopentadiene Co-dimer | 6.38 |
| Indene | 4.81 |
| Heavier Components | 27.95 |
| Unknowns | 9.88 |

Column 11 was operated under 100 mm of Hg absolute, an overhead temperature of 164° C. The overhead stream passing from Column 11 through line 12 and having the following composition:

| | Wt. % |
|---|---|
| Cyclopentadiene | 1.60 |
| Methyl Cyclopentadiene | 0.67 |
| Toluene | 1.11 |
| Butadiene-Cyclopentadiene Co-dimer | 2.28 |
| Ethyl Benzene | 3.06 |
| Xylenes | 4.93 |
| Styrene | 20.98 |
| Dicyclopentadiene | 40.99 |
| Methyl Cyclopentadiene-Cyclopentadiene Co-dimer | 7.54 |
| Indene | 6.76 |
| Heavier Components | 0.17 |
| Unknowns | 9.90 | was passed to the preheater 13 while the heavy components, i.e. the $C_{10}^+$ fraction, were removed from the system through line 14. As the overhead stream from column 11 passes into preheater 13 the pressure on such stream is increased to 30 psig and the temperature is increased to 210° C. After remaining in the preheater 13 at these conditions for about 2.4 seconds, the preheated product is passed through a let-down valve and flashed to a pressure of 10 psig prior to passing into cracker 15. The cracking reactor 15 is operated at 10 psig, 410° C., with a residence time of 0.8 seconds and a heat flux of 35,000 Btu/ft². As the preheated stream passes through the cracker 15 substantially all of the dicyclopentadiene contained therein cracks to cyclopentadiene but (as indicated by the analysis below) due to the low contact time, little carbonization or polymerization occurs:

| | Wt.% |
|---|---|
| Butadiene | 0.83 |
| Cyclopentadiene | 46.18 |
| Methyl Cyclopentadiene | 6.92 |
| Toluene | 1.59 |
| Butadiene-Cyclopentadiene Co-dimer | 0.03 |
| Ethyl Benzene | 2.96 |
| Xylenes | 4.95 |
| Styrene | 19.78 |
| Dicyclopentadiene | 0.51 |
| Methyl Cyclopentadiene-Cyclopentadiene Co-dimer | 0.22 |
| Indene | 6.02 |
| Heavier Components | 1.02 |
| Unknowns | 8.99 |

The cracked stream flows through line 16 to a stripping column 17 where the stream is steam stripped with a proportion of steam of about 0.4 times the volumetric rate of feed to the column 17. This column 17 was operated at an overhead temperature of 33° C., a bottoms temperature of 120° C. and a reflux ratio of 1:1 to produce an overhead product having the following composition:

| | |
|---|---|
| $C_4$'s | 1.3% |
| Cyclopentadiene | 97.2 |
| Butadiene-CPD Co-dimer | 0.4 |
| Methyl CPD-CPD Co-dimer | 0.2 |
| Methyl CPD | 0.5 |

The overhead from the steam stripping Column 17, containing substantially all of the cyclopentadiene from the feed, passed through line 18 to a dimerizer or soaking zone 19 where it was retained for about 11 minutes at about 128° C. and 170 psig before passing from the system to storage.

After storage for several hours at room temperature, the analysis of the product from the dimerizer 19 was as follows:

| | |
|---|---|
| Lights | 1.3% |
| CPD | 1.6 |
| Butadiene-CPD | 0.5 |
| DCPD | 95.5 |
| Methyl CPD-CPD | 0.7 |
| Unknowns | 1.0 |

By the method of this invention, about 99.5 percent of the dicyclopentadiene in the feed was recovered in substantially pure form. The bottoms from the stripping column 17 was substantially free of dicyclopentadiene or other dienes and is suitable as a catalytic resin oil.

As feed stock to the process of this invention, substantially any dicyclopentadiene-containing $C_8^+$ stream is suitable but the process is particularly adapted to streams containing from about 15 to about 40 weight percent dicyclopentadiene and derived from the thermal cracking of light hydrocarbons.

In the first distillation step in Column 11 the dicyclopentadiene is removed from the column in the overhead stream. It is desirable to operate at a reduced pressure of between about 50 and about 200 mm of Hg absolute, to maintain an overhead temperature of about 125° to about 135° C. and to maintain the bottoms at a temperature no higher than about 165° C. The bottoms from this column containing the heavy $C_{10}^+$ hydrocarbons may be used for fuel value or as a possible blending stream with Bunker C fuel oil.

After leaving the distillation column 11, the overhead stream passes to the preheater 13 where the pressure is increased to between about 30 psig and 50 psig for a residence time of between about 0.5 and about seconds and the temperature of the stream is increased to a point above the vaporization temperature of dicyclopentadiene at atmospheric pressure, e.g. to between about 200 and about 250° C. From the preheating zone, the stream flashes into the cracker 15 which is operated at a pressure between atmospheric and about 15 psig. A heat flux between about 25,000 and 40,000 Btu/ft²/r is employed to produce a cracking temperature of 350° to 420° C. Residence time in the cracker is between about 0.1 and about 2.5 seconds and substantially all of the dicyclopentadiene is cracked to cyclopentadiene in this zone. The time required to achieve substantially complete cracking of the dicyclopentadiene to cyclopentadiene is not only dependent on the temperature and heat flux employed but will also vary with the concentration of dicyclopentadiene in the feed to the cracker i.e. the higher the concentration of dicyclopentadiene the longer the time required for substantially complete cracking.

The cracked product from the cracker 15 passes to a distillation column to remove the cyclopentadiene as the overhead stream. It is preferred to employ steam stripping and to operate the column at an overhead temperature of from 30°–40 C. and a bottoms temperature of 110°–140° C. This column is preferably operated at or about atmospheric pressure and with a flow of steam which is equal to from about 0.4 to about 0.5 times the volume of the feed flow to the column. The column underflow is suitable as a catalytic resin oil and contains such materials as the styrene and indene contained in the original feed stock.

From the overhead of the steam stripping column, the produce containing substantially all of the cyclopentadiene passes to a dimerizer or soaking zone where it is held for a period of from about 10 to about 20 minutes at a temperature of between about 120° to about 140° C. under a pressure of from about 130 to about 200 psig. The product is then passes to a finished product storage tank wherein the dimerization of the cyclopentadiene to dicyclopentadiene is completed.

In this manner, between 97 and 99.5 percent of the dicyclopentadiene contained in the original feed stock is recovered having a purity of 95 percent or greater without employing any recycle to the system, without the use of diluents and producing little carbonization or polymerization.

I claim:

1. A process for recovering purified dicyclopentadiene from a $C_8^+$ feed stock containing the same which process comprises
   1. continuously passing said feed stock to a vacuum distillation tower and removing substantially all of the dicyclopentadiene in the overhead stream therefrom,
   2. passing said overhead stream from said vacuum distillation column to a preheater operated at above atmospheric pressure and at a temperature above the vaporization temperature of dicyclopentadiene at atmospheric pressure,
   3. passing the preheated stream to a cracker operated at a pressure below that of said preheater and heating said stream to a temperature between about 350° and about 420° C. and at heat flux of between about 25,000 and about 40,000 Btu/ft²/hr for a time sufficient to crack the dicyclopentadiene contained therein to cyclopentadiene,
   4. passing said cracked stream to a distillation column and removing the cyclopentadiene therefrom in the overhead stream from said column,
   5. passing said cyclopentadiene-containing overhead stream to a dimerizer wherein said stream is maintained for a period of from about 10 to about 20 minutes at a temperature of between about 120° and about 140° C. at a pressure of between about 130 and about 200 psig, and
   6. removing the dicyclopentadiene from said dimerizer.

2. The process of claim 1 wherein the vacuum distillation column of step (1) is operated at between about 50 and about 200 mm of mercury absolute, the overhead temperature is maintained at between about 125° and about 135° C. and the bottoms temperature is maintained at about 165° C. or less.

3. The process of claim 1 wherein the preheater of step (2) is operated at a temperature of between about 30 and about 50 psig and the stream therein is heated to a temperature of between about 200° and about 250° C. for a residence time of between about 0.5 and about 5.0 seconds.

4. The process of claim 1 wherein the distillation column of step (4) is operated as a steam stripping column employing steam in a proportion of from about 0.4 to about 0.5 times the volume of the flow of feed to the column and wherein the overhead temperature is maintained between about 30° and about 40° C.

5. A process for recovering substantially pure dicyclopentadiene from a $C_8^+$ feed stock containing the same which comprises
   1. continuously passing said feed stock to a vacuum distillation tower operating at between about 50 and about 200 mm of Hg, an overhead temperature of between about 125° and 135° C. and a bottoms temperature of no higher than about 164° C. to remove substantially all of the dicyclopentadiene into the overhead stream,
   2. passing the overhead stream from said column to a preheater operated at between about 30 and about 50 psig and having a temperature sufficient to heat said stream to a temperature of between about 200° and about 250° C.
   3. retaining said stream in the preheater for a residence time of from about 0.5 to about 5.0 seconds,
   4. passing said preheated stream to a cracker operated at a pressure of from about atmospheric to about 15 psig, at a temperature of between about 350° and about 420° C. and having a heat flux of from about 25,000 to about 35,000 Btu/ft²/hr for a time sufficient to crack substantially all of the dicyclopentadiene to cyclopentadiene,
   5. passing said cracked stream to a distillation column and steam stripping said stream with steam to maintain an overhead temperature of between about 30° and about 40° C. and a bottoms temperature of between about 110° and about 140° C.,
   6. passing the overhead stream to a dimerizer wherein it is heated to a temperature of between about 120° and about 140° C. under a pressure of from about 130 to about 200 psig for a period of from about 10 to about 20 minutes to dimerize a major portion of the cyclopentadiene to dicyclopentadiene, and
   7. removing the dicyclopentadiene from said dimerizer.

* * * * *